Oct. 6, 1942.  A. H. NEULAND  2,297,910
SYSTEM FOR CHARGING AND COOLING INTERNAL COMBUSTION ENGINES
Filed Feb. 18, 1941   3 Sheets-Sheet 1

INVENTOR.
Alfons H. Neuland

Oct. 6, 1942. A. H. NEULAND 2,297,910
SYSTEM FOR CHARGING AND COOLING INTERNAL COMBUSTION ENGINES
Filed Feb. 18, 1941 3 Sheets-Sheet 3

INVENTOR.
Alfred H. Neuland

Patented Oct. 6, 1942

2,297,910

UNITED STATES PATENT OFFICE 2,297,910

SYSTEM FOR CHARGING AND COOLING INTERNAL COMBUSTION ENGINES

Alfons H. Neuland, Irvington, N. J.

Application February 18, 1941, Serial No. 379,459

6 Claims. (Cl. 230—95)

The present invention relates to systems for utilizing the waste energy of explosion gas from the exhaust of internal combustion engines and its object is the provision of improved apparatus of simple construction suitable for rapid production at low cost and capable of effectively utilizing the kinetic energy of the exhaust gas.

In my copending application Serial No. 314,977, filed January 22, 1940, I have disclosed a suction and muffling device for utilizing the exhaust gas from an internal combustion engine by effectively coupling the escaping stream of exhaust gas with the engine cooling air in thin flatwise alternating exhaust and air streams and thereby to draw the cooling air through the engine cooling system and, by the suction or drag on the exhaust gas resulting from coupling the streams in thin flatwise alternating relation, to muffle the explosion sound; reference being hereby made to said copending application particularly with respect to the disclosure of the dual suction and muffling feature of the device.

My present application is a continuation in part of said copending application and my invention has for one of its objects the provision of a device or system for the utilization of a greater portion of the engine exhaust gas energy in a single stage to serve a single purpose or in multiple stages serving several purposes in a manner to increase the muffling effectiveness, and the provision of a relatively high suction first stage utilizing the engine exhaust energy indirectly through the medium of an auxiliary stream of fluid to induce a current of utility fluid into a line for the purpose, for instance, of charging or supercharging the cylinders of internal combustion engines with air or with a combustible mixture and thereby also to muffle the exhaust sound, and the provision of a relatively low suction second stage utilizing the mixture of exhaust gas and auxiliary fluid to draw a current of utility fluid from a point of utilization for the purpose, for instance, of drawing cooling air through the cooling system of an engine and thereby still further to muffle the exhaust sound. Another object being to operate the first stage independently of, or in combination with, the second stage.

Systems heretofore proposed for utilizing the energy of the engine exhaust gas indirectly through the medium of an auxiliary stream of air to induce fluid into the engine cylinders usually rely on long intake and exhaust tubes for their operation and employ reciprocating or rotating elements, developing synchronized shock waves in the system, as the agency for transferring the kinetic energy from the exhaust gas to the fluid to be induced or compressed, involving mechanical complications.

According to my invention the kinetic energy of the engine exhaust gas or fluid is transferred to the utility fluid, to be compressed or induced into a line, by a suction coupling joining all the outflowing exhaust gas and auxiliary fluid with each other in thin flatwise alternating streams and by a compression coupling separating all the inflowing auxiliary and utility fluids into thin flatwise alternating streams. This method of utilizing the exhaust energy to compress the utility fluid does not require oscillating or reciprocating elements, nor depend on synchronized shock waves for its operation and is therefore suited for use with engines having either widely varying or constant exhaust vibrations such as constant speed or variable speed engines respectively.

The foregoing and other objects and advantages of my invention will appear in the following description and from the drawings showing several embodiments of my invention and will hereafter be more fully defined in the appended claims.

Figure 1:
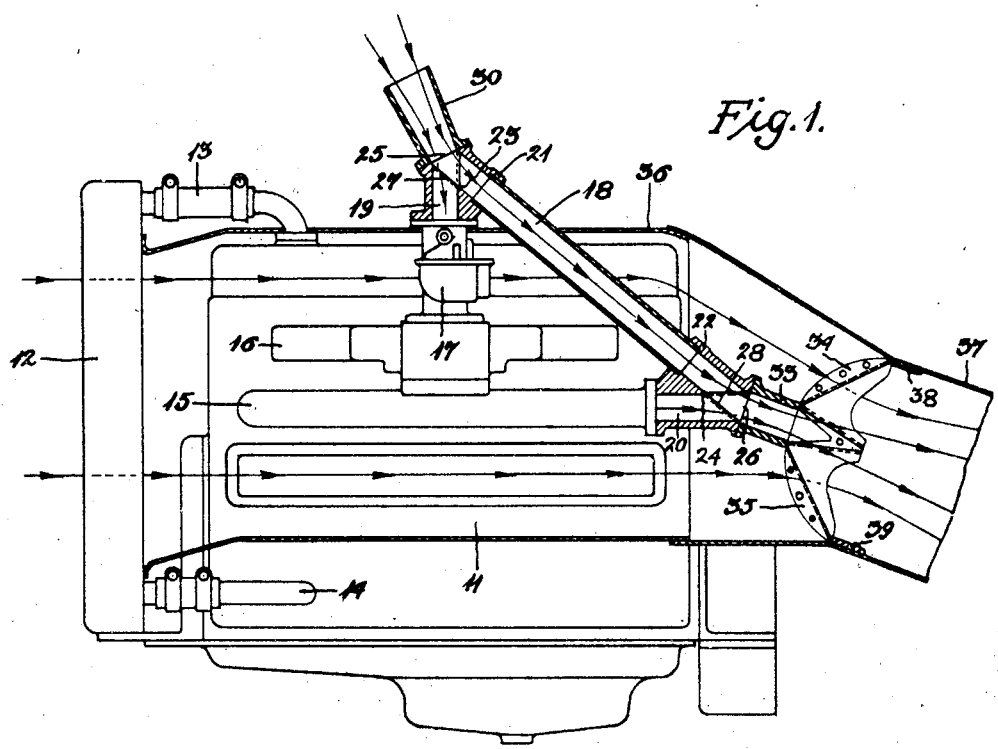
Fig. 1 is a side elevation of a liquid cooled engine embodying my invention, showing the conduits and impellers in section and showing the paths taken by the various streams.
Figure 2:
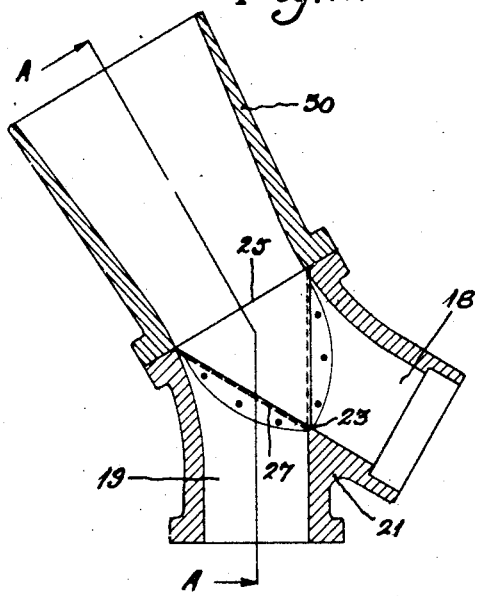
Fig. 2 is a longitudinal sectional view of the induction impeller shown in Fig. 1.
Figure 3:
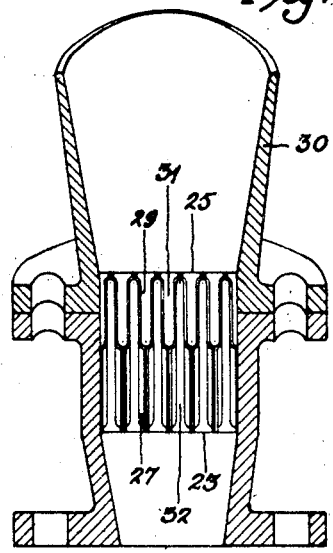
Fig. 3 is a transverse sectional view of the impeller housing shown in Fig. 2, taken on the line AA.

Referring to the illustrated embodiments of my invention and particularly to Figures 1, 2, and 3, the numeral 11 designates a water cooled engine provided with a conventional radiator 12 connected with the engine water jacket by the connectors 13 and 14. The engine includes an exhaust manifold 15, an intake manifold 16, and a carburetor 17, connected with the intake manifold. The exhaust manifold 15 is connected with the carburetor 17 by the intermediate conduit 18 for the purpose of inducing a current of utility or working fluid into the engine manifold by a stream of auxiliary fluid, such as air, drawn through the intermediate conduit 18 by the escaping exhaust gas.

According to my invention I provide means for effectively coupling the utility fluid, such as the engine working fluid with the auxiliary fluid and further provide means for effectively coupling the auxiliary fluid with the exhaust gas comprising preferably specially shaped housings or conduits cooperating with compression and suction coupling impellers in the following manner. The intermediate conduit 18 has one of its portions convergingly joined with the inlet or induction conduit 19, forming therewith a joint inlet conduit or compression impeller housing 21 providing a joint inlet passage 25 for the flow of fluid into the induction and intermediate conduits and has another of its portions convergingly joined with the outlet or exhaust conduit 20, forming therewith a joint outlet conduit or suction impeller housing 22, providing a joint outlet passage 26 for the flow of fluid out of the exhaust and intermediate conduits. For the sake of convenience in construction I have shown the conduits 19 and 20 formed separately from the intermediate conduit 18 and separately from the carburetor 17 and exhaust manifold 15, respectively, to form separate housings 21, 22, although it should be understood that these housings may be formed partly or wholly integral with the conduit 18 or with the carburetor and exhaust manifold. The conduits 19 and 20, converging with the conduit 18 form therewith lines of convergence 23, 24, which will also be referred to as conduit junctures, and at a distance from said conduit junctures form joint inlet and outlet passages or openings 25, 26 of preferably quadrangular or rectangular shape having two of their opposing sides substantially aligned with the conduit juncture so as to provide the necessary co-operation with quadrangularly shaped impellers.

I provide an induction or compression fluid coupling impeller 27 within the joint inlet conduit or housing 21 comprising a series of closely spaced separators or plates 29, shown in Fig. 3, distributed flatwise between opposite sides of the joint passage and crosswise with respect to the conduit juncture and having a portion of their edges provided with closures, preferably by bending adjacent side edges in opposite directions, to form a wavy or undulating partition extending from the conduit juncture providing a series of narrow flatwise adjacent and edgewise expanding or wedge shaped ducts communicating edgewise and in alternating relation with the induction and intermediate conduits and extending edgewise across the joint passage. The wedge shaped ducts have open bases arranged to face outwardly and have their apexes arranged to face toward the line of convergence so that alternate ducts converge edgewise with one conduit and intermediate ducts converge edgewise with an associated conduit. I also provide a suction fluid coupling impeller 28 within the joint outlet conduit or housing 22 which may be, and in the illustrated embodiment is identical with the compression impeller just above described.

The suction impeller 28 forms the exhaust gas from conduit 20 into a series of thin spaced pressure streams and distributes the pressure streams throughout the entire section of the joint passage. Emerging from the pressure ducts the streams of exhaust gas spread until adjacent streams substantially meet and bridge the intervening spaces and establish a considerable vacuum in the intermediate ducts and in the conduit 18, resulting in a rapid flow of air from conduit 18 into the suction impeller 28 in the form of a series of spaced thin suction streams. The suction impeller distributes the suction streams throughout the entire section of the joint passage, establishes a long line of contact between both flat sides of the streams and thus joins the pressure and suction streams with one another in thin flatwise alternating relation providing an effective coupling between exhaust and auxiliary fluids. The effective coupling between streams and the suction or drag which the impeded air stream exerts upon the exhaust gas by reason of the transfer of the kinetic energy from the exhaust gas to the air stream operates to muffle the explosion or exhaust sound of the escaping exhaust gas as heretofore disclosed in my above identified copending application.

The incoming air is preferably drawn in through a nozzle 30 having a diminishing section that serves to gradually accelerate the air stream and to direct it into the joint inlet passage 25 at high velocity. The induction impeller 27 splits the incoming air into a series of thin, flatwise adjacent streams and directs alternate streams into the auxiliary conduit 18 through ducts 31, to form the auxiliary stream, and directs intermediate streams into the conduit 19 through vacuum ducts 32 to form the utility or working fluid stream, which from the conduit 19 flows into the carburetor and engine manifold. The considerable vacuum in the conduit 18 causes a rapid flow of air into the nozzle 30 and the high velocity with which the incoming air is made to impinge on the induction impeller, causes it to develop a velocity pressure head in the pressure ducts 32 and in the conduit 19 leading to the carburetor and engine manifold. With my construction and arrangement I secure a long line of contact between the auxiliary and working fluid streams at the point of their formation into separate streams, the close flatwise association between the streams operating to greatly minimize the formation of eddy currents which would tend to oppose the development of pressure in the induction conduit. In this manner the energy of the exhaust gas is utilized to charge or supercharge the engine and thereby to substantially increase its power output. While the exhaust gas stream is only indirectly coupled with the working fluid stream by the medium of the auxiliary fluid stream it nevertheless operates to substantially compress the working fluid stream because of its effective coupling with the auxiliary stream developing a relatively high degree of suction and the similarly effective coupling of the auxiliary stream with the working fluid stream, accomplished by my construction and arrangement.

In order to further increase the compression of the working fluid I shape the induction impeller so that the thickness of the ducts 31 exceeds that of the ducts 32, as shown in Fig. 3. With such an arrangement the mass and inertia of the auxiliary air stream is made to exceed that of the working fluid stream and is accompanied by a greater suction and pressure differential between conduits 18 and 19. Furthermore my construction of the conduits and impeller, providing gradual and smooth convergence of the conduits with each other and with their respective ducts, facilitates the flow of the streams and increases their velocity, particularly at the point of their separation in the joint inlet passage and at the point of their convergence in the joint outlet passage, whereby a still further compression of the working fluid is secured.

The impeller housing illustrated in Figures 2 and 3 is proportioned to form a substantially square joint passage. However it should be noted that it may often be desirable to proportion the housing so that it will form a quadrangular or rectangular joint passage of oblong shape with the line of convergence having substantially the same length as the long axis of the quadrangle or rectangle. Such proportioning reduces the length of the wedge shaped ducts and reduces the frictional losses of the streams.

As heretofore stated I also provide for effective cooling of the engine by a combination of the charging system with the engine cooling system. This is accomplished by conducting the mixture of exhaust gas and auxiliary air stream through a conduit or exhaust nozzle 33 into preferably a pair of impellers 34 and 35 associated therewith and providing an air conduit 36 for the cooling air, extending from the radiator 12 and having a joint exhaust passage or exit conduit 37 associated with the impellers forming therewith a low suction second stage. Each of the impellers 34, 35 although larger, may be constructed like the induction or exhaust impellers heretofore described and a portion of their side edges may be fastened together to simplify assembly; the impellers being held in place by retainers 38 and 39. In the first stage of this arrangement the exhaust gas of relatively small mass but high temperature and pressure is utilized to develop a high vacuum which serves to muffle the exhaust sound and to compress the working fluid as heretofore described, and as the exhaust gas flows into the exhaust nozzle 33, it mixes with and a portion of its heat and kinetic energy are transferred to the air stream from the auxiliary conduit 18 so that the mixture flowing through the nozzle 35 in the second stage has a relatively lower temperature and pressure but a larger mass. This increase in the mass of the impelling medium permits the use of cooling air impellers of large section in the second stage capable of operating with low suction and enables me to draw a large volume of cooling air through the cooling air conduit and thereby to effectively cool the engine and still further muffle the exhaust sound.

The paths taken by the various streams is shown by the streamlines and arrows. In the system shown in Fig. 1, a portion of the air from the nozzle 30 flows into the carburetor and another portion flows into conduit 18 and nozzle 25 where it mixes with the exhaust gas. The mixture enters alternate ducts and is split up into a series of thin flatwise parallel but separated streams by the impellers 34, 35. The partial vacuum thus developed in the intermediate ducts draws cooling air through the radiator 12 and expells it into the joint exit passage 37.

Figure 4:
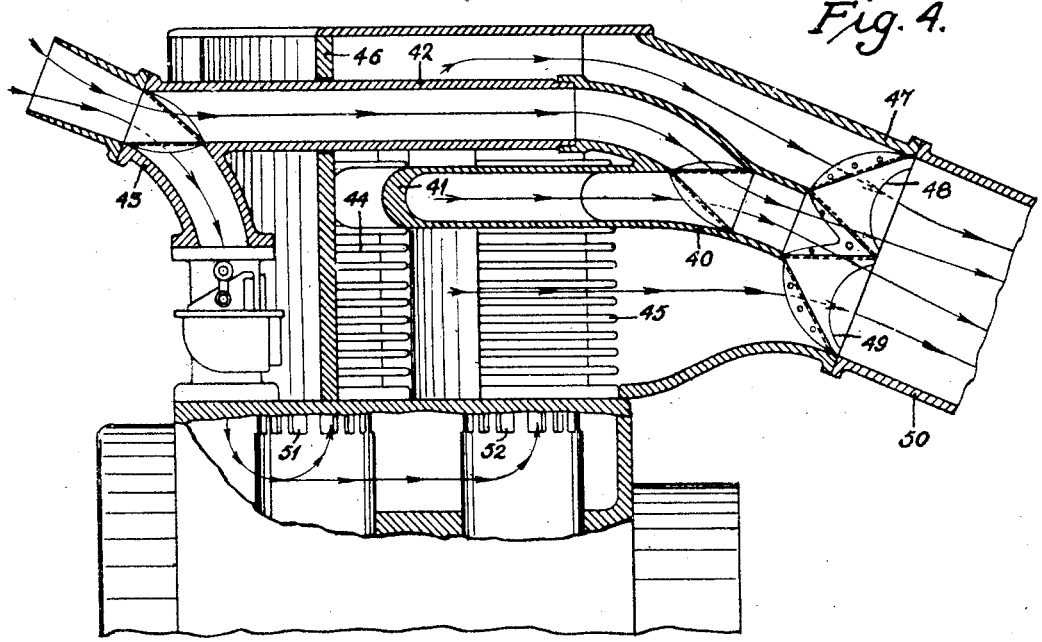
Fig. 4 is a side elevation of an air cooled engine embodying my invention and showing the conduits and impellers in section and showing the paths taken by the several streams.

In Fig. 4, I have shown how my system may be applied to an air cooled engine, in this instance, of the type in which the working fluid is drawn in through ports in the cylinder walls and the exhaust gas is expelled through an exhaust manifold associated with the upper part of the engine. In this embodiment the undulating impeller partitions are identical with those heretofore described in connection with Fig. 1, but their housings have been modified to show, for instance, how the exhaust impeller housing 40 may be formed integral with the exhaust manifold 41, and how the auxiliary conduit 42 may be formed integral with induction impeller housing 43. The engine cylinders are provided with cooling fins 44, 45 over which an air jacket 46 is fitted which directs the air into a conduit or joint passage 47 with which the cooling air impellers 48, 49 and the exhaust nozzle 50 are associated. The paths taken by the various streams, again shown by streamlines and arrows, are substantially as heretofore described in connection with Fig. 1, except that the working fluid is conducted through the ports 51, 52 and the cooling air is drawn past the fins 44 and 45 for a direct transfer of the engine heat to the cooling air stream.

Figure 5:
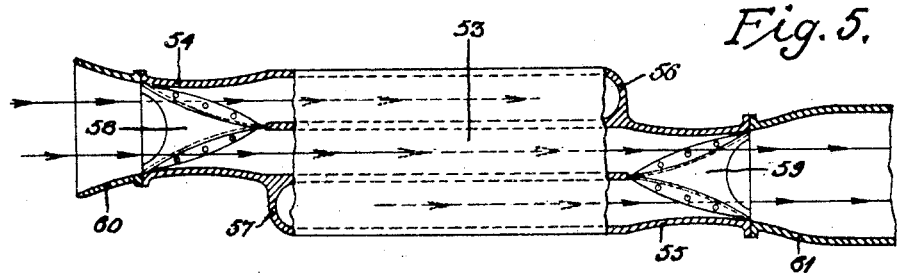
Fig. 5 is a side elevation, partly in section, of an engine manifold embodying my invention.

In Fig. 5, I have shown how my charging system may be applied to the manifold of a carburetorless engine such as a compression ignition engine. In this embodiment the auxiliary conduit 53, and induction and exhaust impeller housings 54 and 55 respectively are formed integral with inlet manifold 56 and exhaust manifold 57. The impellers 58 and 59 are identical with those described in connection with Fig. 1 and are held in place by the nozzles 60, 61.

Figure 6:
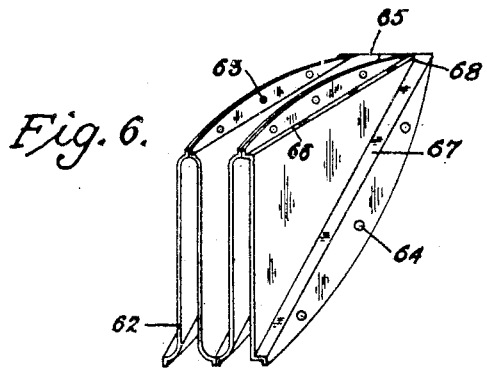
Fig. 6 is a fragment of a form of impeller made up of specially shaped individual plates.

Fig. 6 illustrates a fragment of a preferred form of impeller partition. It is made up of a series of separators or plates 62, fastened together at their side edges by suitable means, such as welding or by the rivets 63, 64; the side edges of each plate being bent in opposite directions and shaped so that they converge to form, with adjacent plates, a continuous edge 65 preferably at right angles to the plate. In the figure the side edges 66, 67, of the plate at the right have been sharply bent to clearly show how they converge at the point 68, to form a continuing edge, although it should be understood that the side edges should preferably be curved so as to facilitate the flow of the air stream. While the side edges of the wedge shaped ducts shown in Figure 6, extend from base to apex in a straight line, it should be noted that they may be formed to bulge inwardly, as in Figure 5, or they may be formed to bulge outwardly, depending upon the shape of the impeller housing and the degrees of streamlining desired.

Figure 7:
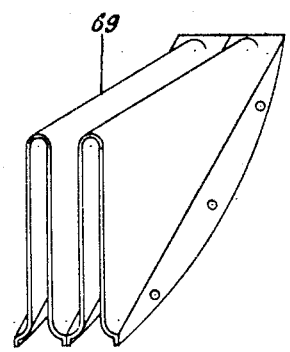
Fig. 7 is a fragment of another form of impeller made up of specially shaped U sections.

A modified form of impeller partition is shown in Figure 7. It differs in that it is made up of a plurality of U-shaped sections 69 having their open side edges shaped and fastened together as shown, but is in other aspects the same as the impeller shown in Fig. 6.

Figure 8:
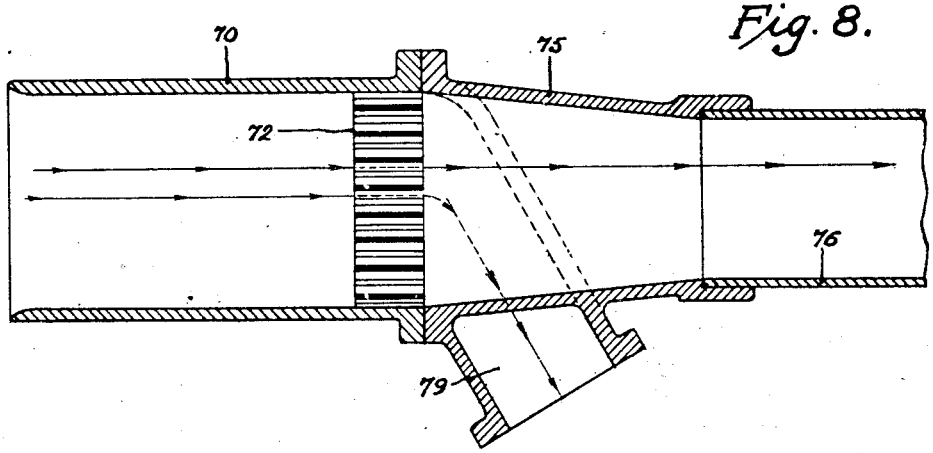
Figures 8, 9 and 10 show a cross section, transverse section and a detail, respectively of still another form of impeller.
Figure 9:
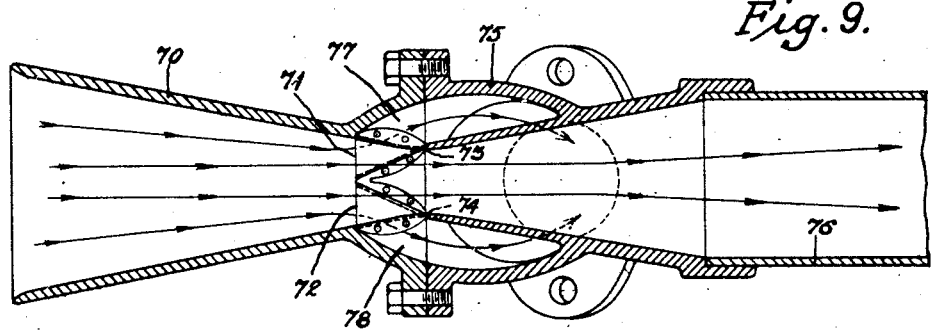
Figure 10:
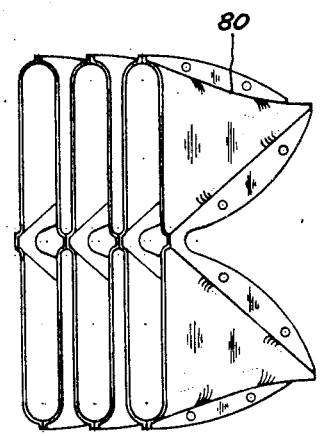

In Figures 8, 9 and 10 I have shown a type of impeller which, although more complicated, is capable of compressing the working fluid to a higher degree.

It comprises a relatively long funnel or nozzle 70 for accelerating the incoming air stream and directing it into an oblong rectangular joint passage, with which the twin impellers 71, 72 are associated. The impellers are arranged to span the narrow or short axis of the passage so that the apexes of the wedge shaped ducts of impeller 71 extend from the line of convergence 73 and the apexes of the wedge shaped ducts of impeller 72 extend from another line of convergence 74, both of said lines of convergence being formed by the long axes of an oblong rectangular passage in the specially shaped impeller housing 75 which is substantially aligned with, but arranged at a distance from the oblong joint passage. With this arrangement the auxiliary air stream flows from the funnel to the conduit 76 in substantially a straight line and is made to attain a high velocity as it impinges upon the impellers. Furthermore because of the provision of twin impellers and their arrangement to span the narrow axis of the passage, the length of the ducts through which the streams must pass is substantially shortened. This reduces the frictional resistance and pressure loss in the ducts and is accompanied by a corresponding increase in the compression of the working fluid. From the streamlines and arrows in the figures, it is seen that the auxiliary air stream flows straight through the central passage in the housing and that the twin impellers direct the working fluid into side passages 77, 78 and thence into the intake conduit 79. Each of the twin impellers is constructed as heretofore described and their attachment to each other is shown in Figure 10. This is preferably accomplished by shaping the plates 80 to form pairs of wedge-like ducts having converging bases and separated or diverging apexes straddling the short axis of the central passage.

It should be noted that various changes may be made in the details of construction of the various elements comprising my system and their combination with each other or with other elements and that one or more of the features disclosed herein may be used in the present or other embodiments without departing from the spirit of my invention, and I desire to cover by my claims such changes and other embodiments which may reasonably be included within the scope thereof.

I claim as my invention:

1. A device, delivering fluid under pressure to a point of fluid pressure utilization by the kinetic energy of a fluid drawn into the inlet of an auxiliary conduit, comprising in combination an induction conduit having an outlet adapted to be connected with said point of fluid pressure utilization and having an inlet joined with the inlet of said auxiliary conduit to form therewith a joint inlet passage for the flow of fluid into the induction and auxiliary conduits, and a stream forming impeller in the joint inlet passage forming a substantially undulating partition extending from the juncture of said conduits providing a series of flatwise adjacent and edgewise expanding suction and pressure ducts communicating edgewise and in alternating relation with the induction and auxiliary conduits respectively and extending edgewise substantially across the interior of the joint inlet passage and distributed flatwise throughout substantially the entire section thereof separating substantially all the inflowing fluid into a series of layer like flatwise alternating suction and pressure streams whereby the alternate layers of fluid drawn into the suction ducts by said source of suction cause the intermediate layers to be impelled into the induction conduit and to develop pressure therein.

2. A device, delivering fluid under pressure to a point of fluid pressure utilization by the kinetic energy of a fluid drawn into the inlet of an auxiliary conduit, comprising in combination an induction conduit having an outlet adapted to be connected with said point of fluid pressure utilization and having an inlet joined with the inlet of said auxiliary conduit to form therewith a joint inlet passage for the flow of fluid into the induction and auxiliary conduits, and a stream forming impeller in the joint inlet passage shaped to form a substantially undulating partition extending from the juncture of said conduits providing a series of relatively narrow flatwise spaced and edgewise expanding pressure ducts and within said spaces providing a series of relatively wider, with respect to the pressure ducts, edgewise expanding suction ducts in flatwise adjacent relation thereto, said pressure and suction ducts communicating edgewise and in alternating relation with the induction and auxiliary conduits respectively and extending edgewise substantially across the interior of the joint inlet passage and distributed flatwise throughout substantially the entire section thereof separating substantially all the inflowing fluid into a series of layer like flatwise adjacent and alternately associated pressure and suction streams whereby a relatively larger volume of fluid drawn into the auxiliary conduit through alternate suction ducts causes a relatively smaller volume of fluid to be impelled into the induction conduit through the intermediate relatively narrow ducts and to develop pressure therein.

3. In a system, utilizing the kinetic energy of explosion gas from a source to deliver air under pressure to a point of air pressure utilization, the combination of an exhaust conduit having an outlet and having an inlet adapted to be connected with said source of explosion gas, an induction conduit having an inlet and having an outlet adapted to be connected with said point of air pressure utilization, an intermediate conduit having an inlet joined with the inlet of said induction conduit to form therewith a joint inlet passage adapted to divergingly separate and conduct the inflowing air into the induction and intermediate conduits and having an outlet joined with the outlet of said exhaust conduit to form therewith a joint outlet passage adapted to convergingly join the air from the intermediate conduit with the exhaust gas from said exhaust conduit, a stream forming suction impeller in the joint outlet passage shaped to form a substantially undulating partition extending from the juncture of the exhaust conduit with said intermediate conduit providing a series of flatwise adjacent and edgewise expanding pressure and suction ducts communicating edgewise and in alternating relation with the exhaust and intermediate conduits respectively and extending edgewise substantially across the interior of the joint exit passage and distributed flatwise throughout substantially the entire section thereof joining substantially all the outflowing gas and air with one another in layer like flatwise alternating pressure and suction streams respectively whereby air at high velocity is drawn into the joint inlet passage by the kinetic energy of the exhaust gas, and a stream forming compression impeller in the joint inlet passage shaped to form a substantially undulating partition extending from the juncture of the induction conduit with said intermediate conduit providing a series of flatwise adjacent and edgewise expanding suction and pressure ducts communicating edgewise and in alternating relation with the intermediate and induction conduits respectively and extending edgewise substantially across the interior of the joint inlet passage and distributed throughout substantially the entire section thereof separating substantially all the inflowing air into layer like flatwise alternating pressure and suction streams whereby alternate layers of air drawn into the suction ducts at high velocity cause the intermediate layers to be impelled into the induction conduit and to develop pressure therein.

4. A fluid coupling device, of the class wherein the kinetic energy of a current of impelling fluid in one conduit serves to induce a flow of impelled fluid in another conduit, comprising in combination a housing providing a pair of convergingly joined passages and at a distance from the passage juncture providing a quadrangular joint passage, one of said first mentioned passages being adapted to be connected with one of said conduits and the other being adapted to be connected with the other conduit, and a stream forming impeller within said housing comprising a series of spaced separators arranged crosswise with respect to the passage juncture shaped to form a substantially undulating partition extending from the passage juncture providing a series of narrow flatwise adjacent and edgewise expanding ducts extending edgewise substantially across said joint passage and distributed throughout substantially the entire section thereof communicating edgewise and in alternating relation with said joined passages forming substantially all the fluid flowing through the joint passage into a series of substantially unidirectionally flowing layer like impelling streams and into a series of layer like impelled streams flowing substantially parallel to and in flatwise alternating relation with said impelling streams whereby the impelling streams are made to act on both flat sides of said impelled streams.

5. A fluid coupling device, of the class wherein the kinetic energy of a current of impelling fluid in one conduit serves to induce a flow of impelled fluid in another conduit, comprising in combination a housing providing a pair of convergingly joined passages and at a distance from the passage juncture providing a quadrangularly oblong joint passage arranged with its long axis substantially parallel to the passage juncture, one of said first mentioned passages being adapted to be connected with one of said conduits and the other passage being adapted to be connected with the other conduit, and a stream forming impeller within said housing comprising a series of spaced plates arranged in flatwise spaced relation along the long axis of the oblong passage and crosswise with respect to the passage juncture, the side edges of said plates being shaped to form a substantially undulating partition extending from the passage juncture providing a series of narrow flatwise adjacent and edgewise expanding ducts extending edgewise substantially across the short axis of said joint passage and distributed flatwise throughout substantially the entire section thereof and communicating edgewise and in alternating relation with said joined passages forming substantially all the fluid flowing through the joint passage into a series of substantially unidirectionally flowing layer like impelling streams and into a series of layer like impelled streams flowing substantially parallel to and in flatwise alternating relation with said impelling streams, whereby the impelling streams are made to act on both flat sides of said impelled streams.

6. A fluid coupling device, of the class wherein the kinetic energy of a current of impelling fluid in one conduit serves to induce a flow of impelled fluid in another conduit, comprising in combination a housing providing a quadrangularly oblong central passage adapted to be connected with one of said conduits and a pair of passages convergingly joined, one on each side, with the long sides of said oblong central passage adapted to be connected with the other conduit and further providing a quadrangular joint passage positioned at a distance from the junctures of said pair of passages with said central passage and substantially aligned therewith; and twin stream forming impellers within said housing, each impeller comprising a series of spaced plates arranged in flatwise spaced relation along the long axis of said oblong passage and crosswise with respect to a passage juncture, the side edges of said plates being shaped to form a substantially undulating partition extending from a corresponding passage juncture providing a series of narrow flatwise spaced and edgewise expanding ducts communicating edgewise with a corresponding passage of said pair of passages and between said narrow ducts providing a series of intermediate ducts communicating with said central passage, the ducts in said twin impellers being distributed throughout substantially the entire section of said joint passage and arranged so that the bases of the ducts jointly extend edgewise substantially across said joint passage and so that their apexes straddle the short axis of said central passage forming substantially all the fluid flowing through the joint passage into a series of substantially unidirectionally flowing layer like impelling streams and into a series of layer like impelled streams flowing substantially parallel to and in flatwise alternating relation with said impelling streams whereby the impelling streams are made to act on both flat sides of said impelled streams.

ALFONS H. NEULAND.